May 25, 1943.  F. B. THOMAS  2,319,892
COUPLING FOR RODS OR SHAFTS
Filed Jan. 25, 1943
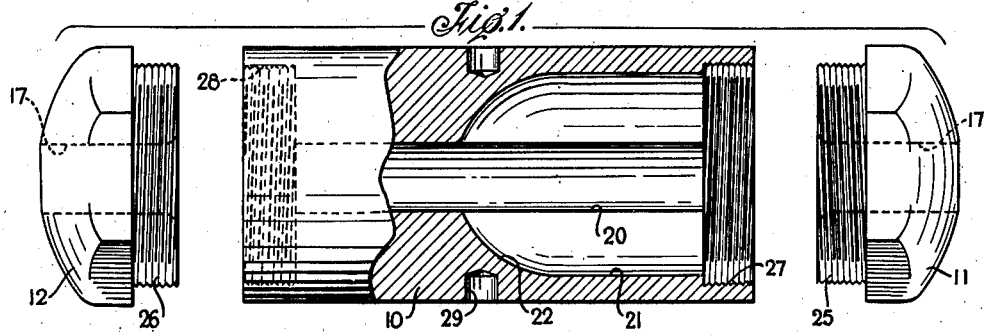
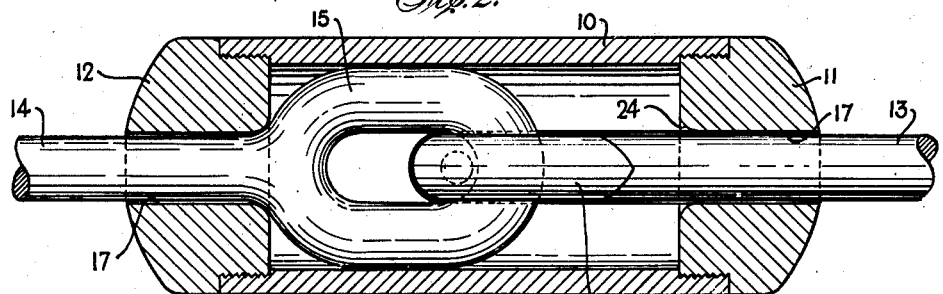
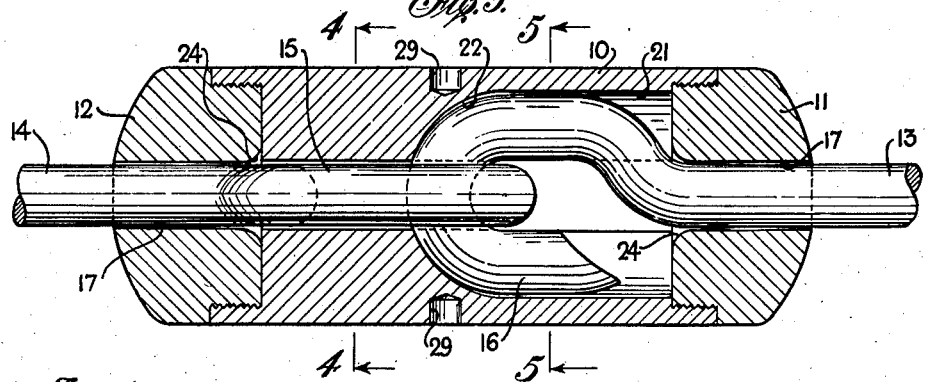
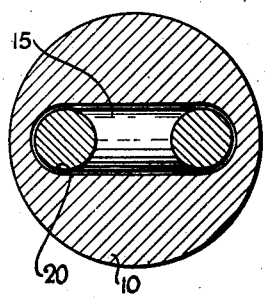
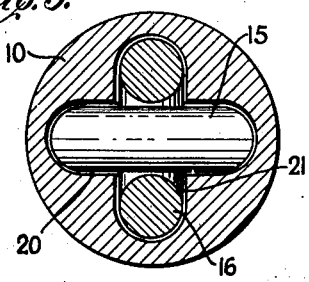
Inventor
FRANK B. THOMAS Patented May 25, 1943

2,319,892

UNITED STATES PATENT OFFICE 2,319,892

COUPLING FOR RODS OR SHAFTS

Frank B. Thomas, Akron, Ohio

Application January 25, 1943, Serial No. 473,559

4 Claims. (Cl. 287—104)

This invention relates to couplings and more especially it relates to couplings for sectional rods or shafts such as are used for the transmission of power.

The invention is of especial utility in its application to the sectional driving rods of drain- or sewer-cleaning apparatus. Such rods usually comprise sections of 16-foot length that are coupled end-to-end to provide the total length required. The leading end of the sectional rod is provided with a boring tool, such as an auger, and the opposite end of the rod is connected to a suitable motor for turning the rod. The auger is adapted to propel itself and the rod through a clogged sewer as the rod is driven, usually at high speed, and to sever the material from the wall of sewer so that it may be flushed therefrom. As the rod progresses through the sewer the driving thereof is periodically halted so the additional sections of rod may be coupled to the trailing or driving end thereof. In apparatus of the character mentioned the problem of breakage of the rod is a serious matter since there is difficulty in retrieving shafts that break at any point within a sewer. In apparatus heretofore provided breakage very frequently has occurred in the rod couplings, due to play therein or to constructions which result in excessive torsional strains on the rod-ends, and it is to the relief of these conditions that this invention primarily is directed.

The chief objects of the invention are to provide a superior rod coupling of the character mentioned; to provide a coupling that will be light in weight; that may be assembled with the sectional rod readily and in a facile manner; that will be strong and durable in use; that will prevent movement of conjoined ends of rod-sections relatively of each other and relatively of the couplings; and that will reinforce the rod-ends against strains incidental to service use. Other objects will be manifest as the description proceeds.

Of the accompanying drawing:

Fig. 1 is an elevation of the several elements of a coupling embodying the invention, shown in dis-assembled condition, a part thereof being in section:

Fig. 2 is a diametric longitudinal section of the improved coupling, and the conjoined end portions of a pair of rod-sections with which the coupling is operatively associated;

Fig. 3 is a view similar to Fig. 2 but in a plane disposed at 90 degrees thereto;

Fig. 4 is a section on the line 4—4 of Fig. 3; and

Fig. 5 is a section on the line 5—5 of Fig. 3.

Referring to the drawing, it will be seen that the improved coupling consists of three parts, namely, a cylindrical body or sleeve portion 10, and rounded caps 11, 12 mountable upon the respective ends of said body portion 10, all of said parts being of metal. Said coupling is adapted for use with a sectional driving rod or shaft, of which the adjacent ends of two sections, designated 13 and 14 respectively are shown herein. One end of each rod-section is formed with a closed loop or eye, such as the eye 15 on the section 14, and the other end of each section is formed with an open hook, such as the hook 16 on the section 13. The hook 16 of one rod-section is receivable in the eye 15 of the adjacent rod-section, as shown, to connect the sections end to end when a complete driving rod is assembled. During manufacture of the rod-sections 13, 14, which sections may be of identical construction, coupling caps 11 and 12 are mounted thereon before the hooks 16 are formed, the said caps being determinately disposed with relation to each other as presently will be explained. The caps 11 and 12 are formed with respective axial bores 17 to receive the rod-sections.

The coupling body or sleeve 10 is arranged to be telescoped over the coupled ends of rod-sections 13, 14, and to this end is formed interiorly with a slot 20 extending from end to end thereof. The slot 20 is of the same transverse profile as the rod-eye 15, as is most clearly shown in Fig. 4, and enables the coupling body 10 to be passed over the eye 15 and onto the rod 14, during the assembling of a driving rod, before the hook 16 of rod-section 13 is engaged with said eye. The coupling body 10 also is formed interiorly with a slot 21 that has the same transverse shape as the slot 20, and is disposed in a plane that is at right angles to the plane of the latter. The slot 21 extends from one end of the body 10 substantially to the middle thereof, and has its inner end arcuately shaped as at 22 substantially on the same radius as the curvature of the end of a rod-hook. Thus, after the hook 16 is engaged with the eye 15, the coupling body 10 may be slid from the rod 14 and over the coupled rod-ends, the eye 15 being received in the slot 20 of the body and the hook 16 being received in the slot 21 in the body, the arcuate inner end 22 of slot 21 abutting said hook, as shown in Fig. 3. For clearness of illustration, clearance has been shown between the slots 20, 21 and the respective eyes 15 and hooks 16, but it is preferred that the hook and the eye have an easy sliding fit in the respective slots, with no visible clearance therebetween.

The caps 11, 12, when operatively assembled with the coupling body 10, are so constructed that their inner ends will engage the respective eye-and-hook formations and thereby prevent relative movement of the coupled rod sections axially of the coupling. The inner ends of the aperture 17 of said caps are rounded, as shown at 24, to prevent scoring of the hook-and-eye formations by engagement therewith. The caps 11, 12 are secured to the body 10 by being threaded into opposite ends thereof, and for this purpose the caps are provided with reduced threaded portions 25, 26 respectively, that are receivable in complementally threaded countersunk regions 27, 28 in the coupling body. As shown, the threads 25 are right-hand threads and the threads 26 are left-hand threads. The position of the right-hand threads and left-hand threads bears a definite relation to the direction of rotation of the drive rod and coupling, the arrangement being such that neither cap 11, 12 will become unthreaded from the coupling body due to rotation thereof. Preferably the caps 11, 12 are formed with local flat regions as shown to enable them to be engaged by a turning tool, such as a wrench, and the body 10 is formed with recesses 29 to receive a pin wrench used for holding said body while the caps are being tightened thereon.

From the foregoing it will be apparent that the improved coupling is externally streamlined so as not to impede the progress of a drive-rod through a drain or sewer. The coupling not only prevents relative angular and axial movement of adjacent rod-sections, but it reinforces the hook-and-eye formations on said sections so that they are not deformed or fractured as the result of torsional strains imposed thereon during use.

Modification may be resorted to without departing from the spirit of the invention or the scope thereof as defined by the appended claims.

What is claimed is:

1. A coupling for rod-sections linked end-to-end by hook-and-eye formations, said coupling comprising a cylindrical metal sleeve telescoped over said hook-and-eye formations, axially apertured caps on opposite ends of the sleeve through which apertures the respective rod-sections extend, and respective slots formed interiorly of said sleeve and receiving said hook-and-eye formations, said slots being arranged to prevent angular movement of said formations relatively of each other and relatively of the sleeve.

2. A coupling for rod-sections linked end-to-end by hook-and-eye formations, said coupling comprising a cylindrical sleeve telescoped over said hook-and-eye formations, axially apertured closure members on opposite ends of the sleeve, the rod-sections extending through said apertures, a slot formed interiorly of the sleeve from end to end thereof, in which slot the eye formation is receivable, and a second slot extending longitudinally of the sleeve, and disposed in a plane that is transverse to the plane of the first-mentioned slot, in which the hook formation is receivable.

3. A combination as defined in claim 2 wherein the second slot extends from one end of the sleeve to a point substantially midway between the ends of the sleeve.

4. A combination as defined in claim 2 wherein the second slot extends from one end of the sleeve to a point interiorly thereof, and has its inner end arcuately shaped complemental to the curvature of a hook formation adapted to bear thereagainst.

FRANK B. THOMAS.